Aug. 20, 1929.  A. W. COPLAND  1,725,342
CENTERING CHUCK
Filed Oct. 22, 1923  2 Sheets-Sheet 1
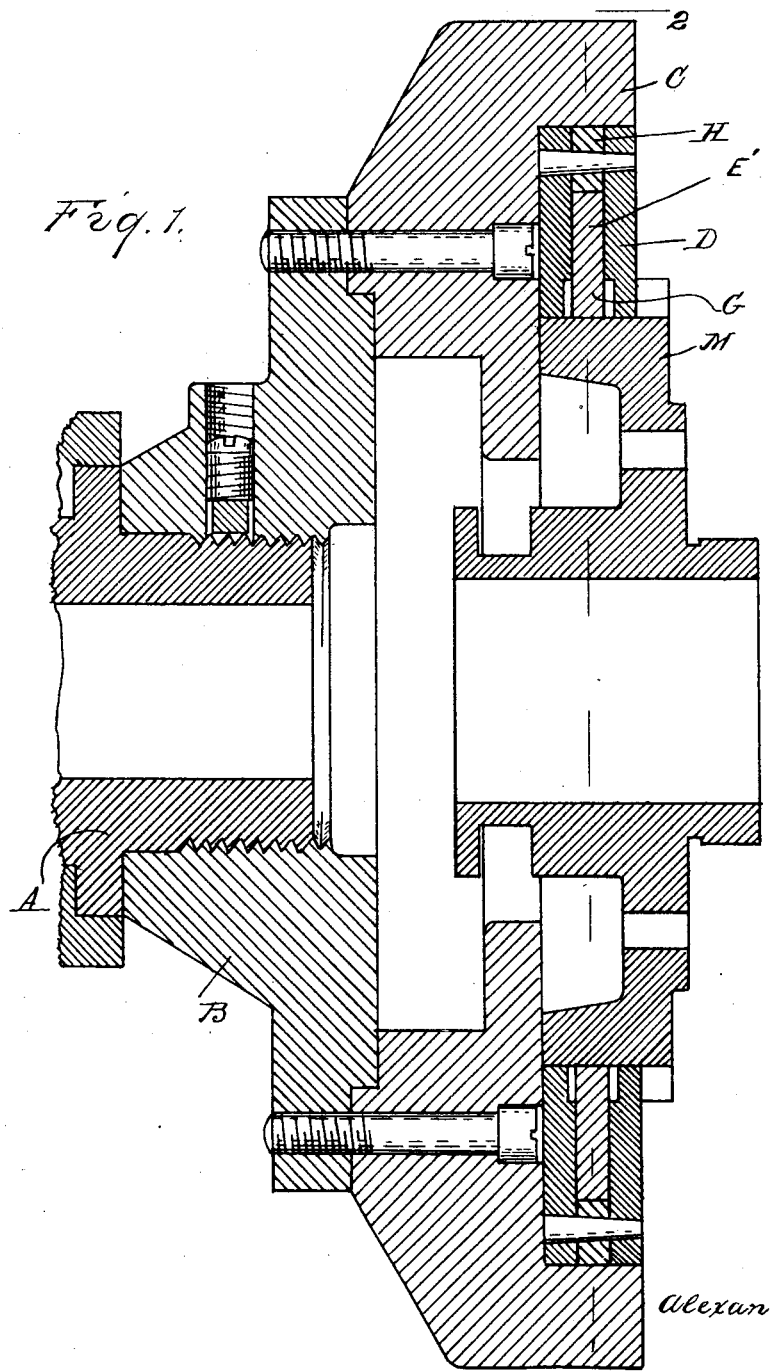
Inventor
Alexander W. Copland

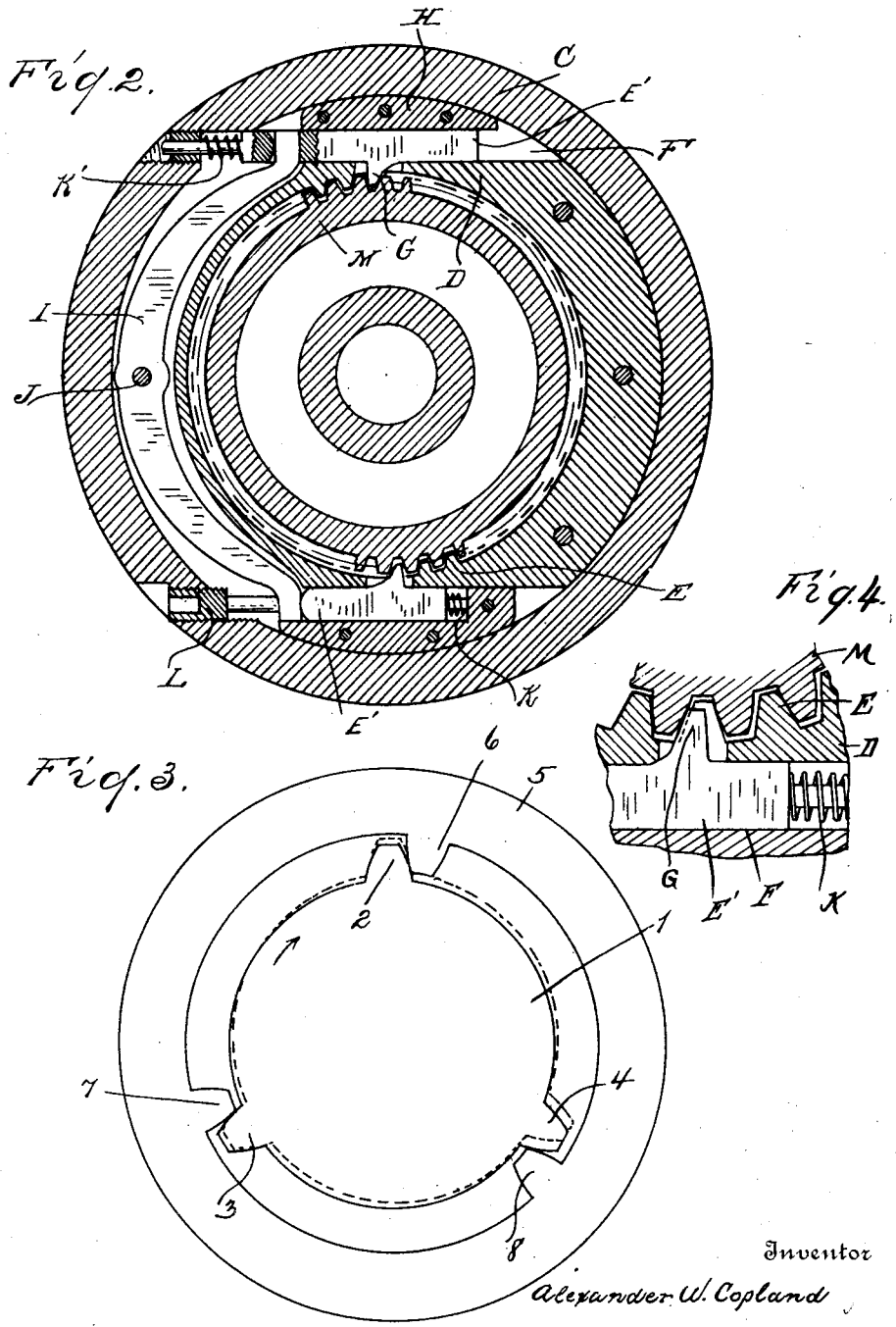

Patented Aug. 20, 1929.

1,725,342

UNITED STATES PATENT OFFICE.

ALEXANDER W. COPLAND, OF DETROIT, MICHIGAN; DETROIT AND SECURITY TRUST COMPANY, ADMINISTRATOR, AND HEATLEY GREEN, EXECUTOR OF SAID ALEXANDER W. COPLAND, DECEASED, ASSIGNORS TO SUSAN D. COPLAND, OF BIRMINGHAM, MICHIGAN.

CENTERING CHUCK.

Application filed October 22, 1923. Serial No. 670,209.

It is the object of the invention to provide means for automatically exactly centering and holding a member having a toothed circular periphery, such for instance as a gear or an index wheel. To this end the invention consists in the novel construction as hereinafter set forth.

In the drawings:

Figure 1 is a longitudinal section through the chuck;

Figure 2 is a cross-section on line 2—2 of Figure 1;

Figure 3 is a diagram illustrating in an exaggerated manner the self-centering principle;

Figure 4 is an enlarged section of a portion of Fig. 2.

When a spur gear is placed in engagement with a corresponding internal gear with a certain amount of clearance or backlash, it is possible for said gears to assume an eccentric relation. If, however, there is imparted to these gears a relative torque stress, this will place their axes in coincidence. The principle involved is illustrated in Figure 3, in which 1 is a spur gear having three teeth, 2, 3 and 4, and 5 is an internal gear having three teeth 6, 7 and 8. As shown in dotted lines, these gears can assume an eccentric relation, due to the clearances provided, but in that eccentric relation at least one of the teeth (4) on the spur gear is out of contact with the co-operating tooth (8) of the internal gear. A torque stress applied to the spur gear in the direction of the arrow will bring the tooth 4 in contact with the tooth 8, but this will also cause the axis of the spur gear to move into coincidence with the axis of the internal gear. Therefore, with any gear having more than two teeth and which is placed in engagement with the complementary gear in an internal-external relation, the application of a torque stress will cause an automatic centering.

As shown in Figures 1 and 2, A is the rotary spindle of a lathe, or any suitable construction of internal grinding machine. B is a head threaded for engagement with the spindle A upon which is mounted the annular head C for holding an internal gear wheel D. The teeth E of this gear wheel D are of the same pitch as those of the gear to be centered, but with sufficient clearance to provide for easily engaging and disengaging said gear.

To apply a torque to the gear which is in engagement with the chuck, I preferably provide a pair of dogs on diametrically opposite sides of the chuck for engaging two of the gear teeth and for yieldably pressing the same in opposite directions. As shown, these dogs E' are in the form of bars slidable in slots F in the gear D and having inwardly projecting fingers G for engaging the teeth of the gear to be centered. The slots F may, if desired, be formed by milling from the periphery of the gear D and segmental guide blocks H are then placed in the outer portion of these slots to assist in guiding the bars E'. I is a segmental lever having its opposite ends in engagement with the bars E' and fulcrumed centrally at J, thereby causing the bars E' to move simultaneously in opposite directions. K and K' are springs for yieldably pressing the bars E' to move the same longitudinally, and L is a screw bearing against one end of the lever I for actuating the same and the connected bars E' in a direction opposed to the pressure of the springs.

With the construction as described, to engage the gear with the chuck, the screw L is adjusted by means of a suitable wrench (not shown) so as to move the fingers G into a position where they will not obstruct the entrance of the gear to be centered such as M. This gear M is then placed in engagement with the internal gear D, after which the screw L is turned in the opposite direction to relieve pressure upon the lever I and to permit the springs K and K' to force the fingers G against two diametrically opposite teeth of the gear M. This will impart a torque to the gear, which will cause the same to automatically assume a position in exact axial coincidence with the gear D. The tension of the springs K and K' is sufficient to hold the parts in this relation during the grinding operation, after which a reverse turning of the screw L will release the gear and permit of replacing the same by another gear to be centered.

While I have specifically described the use of my invention in the centering and holding of a gear, it is obvious that it is equally applicable to any other member having a toothed circular periphery.

What I claim as my invention is:

1. A chuck for automatically centering gears or the like, comprising a head, an internal gear wheel mounted on said head and adapted to telescopically receive the gear to be centered with sufficient clearance for such engagement, and means carried by said head for applying a yieldable pressure against the teeth of the gear to be centered.

2. An automatic centering chuck for gears or the like comprising a hollow head, an internal gear wheel mounted on said head and adapted to telescopically receive the gear to be centered, dogs upon opposite sides of said internal gear wheel for engaging teeth of the gear to be centered, a connection between said dogs for causing the same to move in opposite directions, a spring for yieldably forcing said dogs in one direction, and means for relieving pressure of said spring to move the dogs in the opposite direction.

3. A centering device for a toothed circular member comprising a member having a plurality of fixed teeth arranged to engage the teeth of said first mentioned member and having sufficient clearance to permit the insertion and withdrawal of said first mentioned member, and means for placing a relative torque pressure on said members to exactly center the same.

4. A centering device for a toothed circular member comprising a member having a plurality of fixed teeth arranged to engage the teeth of said first mentioned member and having sufficient clearance to permit engagement, and means movable with respect to said fixed teeth and adapted to engage said first mentioned member to place a torque pressure on said member relative to said fixed teeth.

5. An automatic centering chuck for a toothed circular member comprising a head, a member mounted on said head complementary to and sustaining an internal-external relation to said toothed circular member with sufficient clearance for ready engagement and disengagement, and resilient means for applying a yielding torque to move one of said members in relation to the other thereby exactly centering and holding the same from displacement.

6. A centering device for a toothed circular member comprising a complementary member sustaining an internal-external relation thereto and having a plurality of integral spaced bearings in fixed relation to each other for engagement with said toothed circular member with clearance for permitting such engagement and resilient means for applying a torque to center and hold said members.

7. A centering device for a toothed circular member comprising a complementary member sustaining internal-external relation thereto and having a plurality of teeth for engagement with the teeth of said toothed circular member and resilient means on the diametrically opposite sides of said member for applying pressure in opposite directions to the teeth of said toothed member thereby producing a torque.

In testimony whereof I affix my signature.

ALEXANDER W. COPLAND